United States Patent
Burns et al.

(10) Patent No.: US 6,322,122 B2
(45) Date of Patent: Nov. 27, 2001

(54) COCKPIT SYSTEM OF INTERCHANGEABLE MODULES

(75) Inventors: Gary John Burns, Dearborn; Robert A. Chanko, Livonia; Frederick Andrew Drapala, Canton; Timothy B. Jackson, Willis, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/726,670

(22) Filed: Nov. 29, 2000

Related U.S. Application Data
(60) Provisional application No. 60/167,881, filed on Nov. 29, 1999.

(51) Int. Cl.[7] ................................................. B62D 25/14
(52) U.S. Cl. .............................. 296/24.1; 296/70; 180/90
(58) Field of Search ........................ 296/24.1, 70; 180/90

(56) References Cited

U.S. PATENT DOCUMENTS 5,857,726 * 1/1999 Yokoyama et al. ..................... 296/70
5,938,266 * 8/1999 Dauvergne et al. .................... 296/70
6,095,273 * 8/2000 Aboud et al. ....................... 296/70 X
6,129,406 * 10/2000 Dauvergne ............................ 296/70

FOREIGN PATENT DOCUMENTS

0083701 * 7/1983 (EP) ....................................... 180/90
2079694 * 1/1982 (GB) ....................................... 296/70
0092935 * 5/1985 (JP) ........................................ 296/70

* cited by examiner

Primary Examiner—Dennis H. Pedder
(74) Attorney, Agent, or Firm—Brinks Hofer Gilson & Lione

(57) ABSTRACT

A cockpit system of interchangeable modules for a first vehicle having a left-hand-drive arrangement and for a second vehicle having a right-hand-drive arrangement, including a driver-side module, a passenger-side module, a center module fastenable between the driver-side module and the passenger-side module, a left-hand-drive top module, and right-hand-drive top module. Alternatively, a cockpit system of interchangeable modules for a first vehicle having a narrow cockpit width and for a second vehicle having a wide cockpit width including a driver-side module, a passenger-side module, a narrow center module, a wide center module, a narrow top module, and a wide top module.

29 Claims, 2 Drawing Sheets

COCKPIT SYSTEM OF INTERCHANGEABLE MODULES

This application claims benefit to 60/167,881 filed Nov. 29, 1999.

This patent discloses and claims a useful, novel, and unobvious invention for a cockpit system of interchangeable modules in the art of cockpit systems for a vehicle.

DETAILED DESCRIPTION OF THE PREFERRED EMBODIMENTS

The following description of four preferred embodiments of the invention is not intended to limit the scope of the invention to these preferred embodiments, but rather to enable any person skilled in the art of cockpit systems to make and use the invention.

Figure 1:
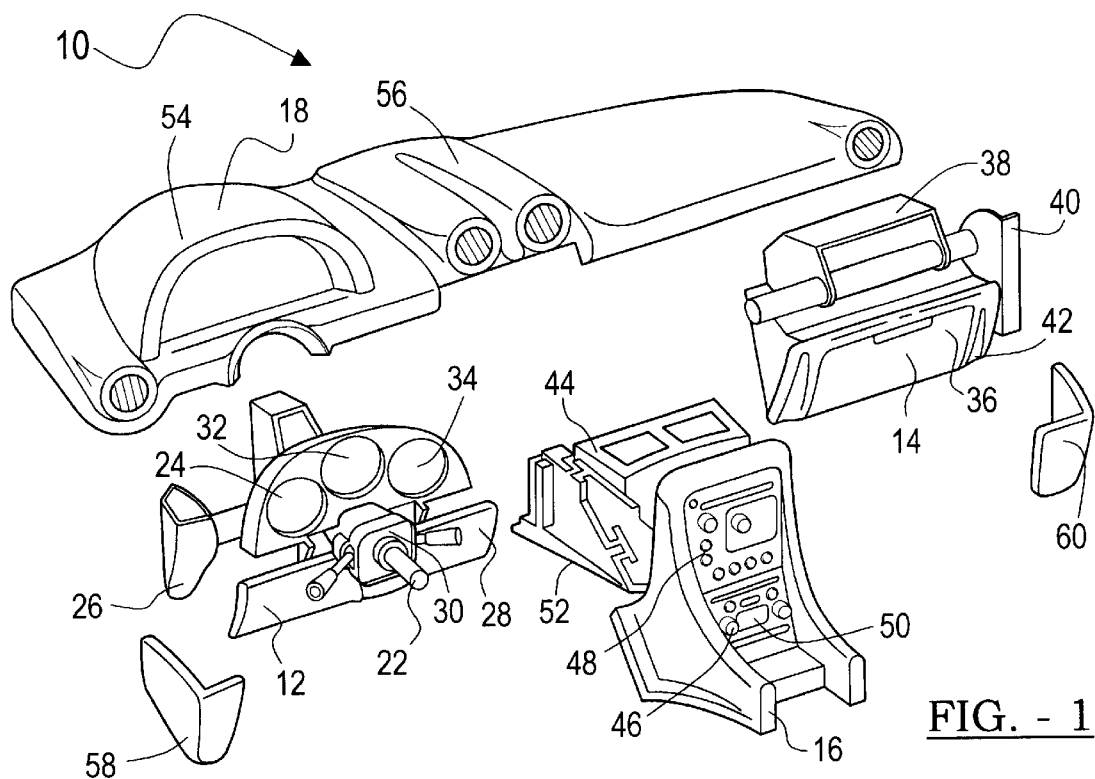
FIG. 1 is an exploded view of a cockpit system of interchangeable modules for a vehicle having a left-hand-drive arrangement, according to a first preferred embodiment of the invention.
Figure 2:
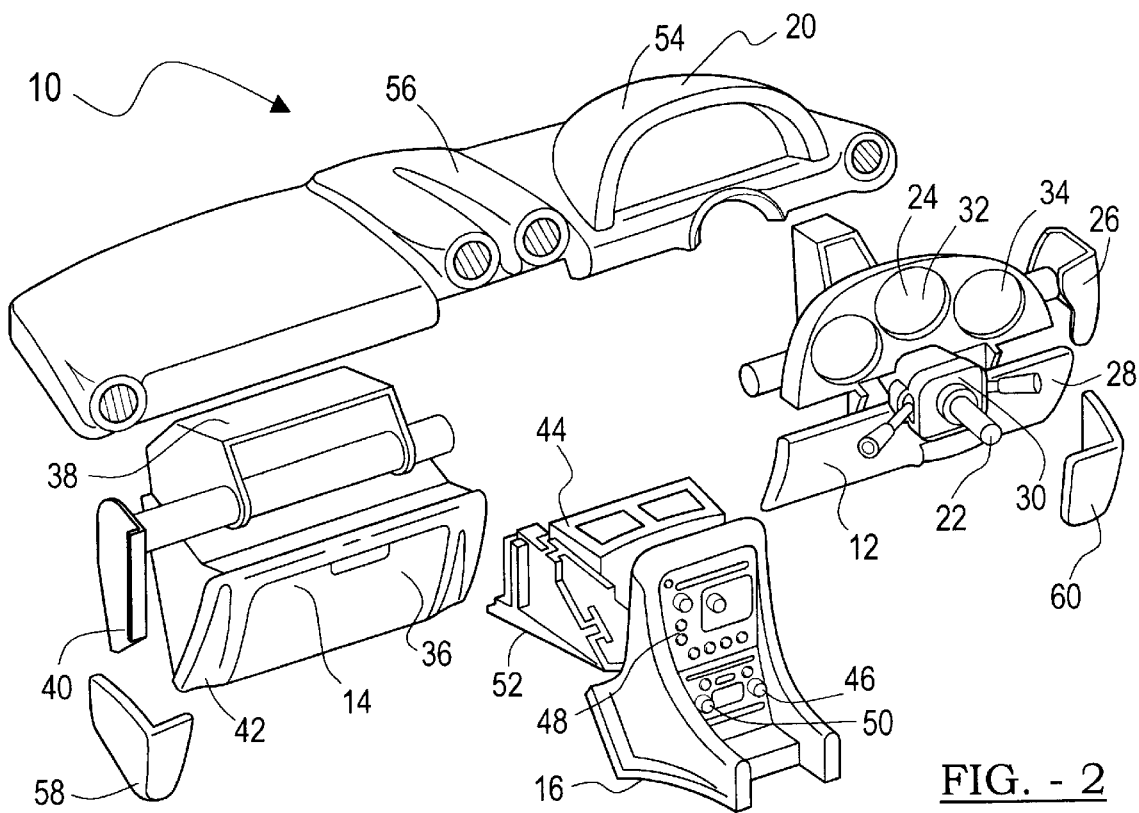
FIG. 2 is an exploded view of a cockpit system of interchangeable modules for a vehicle having a right-hand-drive arrangement, according to the first preferred embodiment of the invention.

As shown in FIGS. 1 and 2, the first preferred embodiment of the invention includes a cockpit system 10 of interchangeable modules for a first vehicle having a left-hand-drive arrangement (shown in FIG. 1) and for a second vehicle having a right-hand-drive arrangement (shown in FIG. 2). The cockpit system 10 of the first preferred embodiment includes a driver-side module 12, a passenger-side module 14, a center module 16, a left-hand-drive top module 19 (shown in FIG. 1), and a right-hand-drive top module 20 (shown in FIG. 2).

The driver-side module 12 preferably includes a steering control 22, a driver display 24, an instrument panel structure 26, and a lower panel 28. The driver-side module 12 may, of course, omit some of these elements or include other elements to assist in the communication of particular information between the driver and the vehicle. The steering control 22, which functions to assist in the communication of wheel orientation, preferably includes a conventional steering column 30, but may alternatively include other suitable devices. The driver display 24, which functions to communicate vehicle speed and remaining fuel, preferably includes an analog or digital speedometer 32 and fuel gauge 34, but may alternatively include other suitable devices. The instrument panel structure 26 functions to connect the driver-side module 12 to the vehicle and is preferably made from a metallic material, but may alternatively be made from other suitable materials. The lower panel 28 mainly provides an aesthetic quality, but may secondarily provide a safety feature. For these reasons, the lower panel 28 is preferably made from an energy-absorbing material and covered with a leather or cloth material, but may alternatively be made from or covered with other suitable materials.

The passenger-side module 14 preferably includes a storage compartment 36 and an air bag device 38. The storage compartment 36 is preferably configured as a conventional glove box, but may alternatively be configured as a shelf or tray. The air bag device 38 preferably includes a conventional air inflater (not shown), but may alternatively include other suitable devices. Like the driver-side module 12, the passenger-side module 14 preferably includes an instrument panel structure 40 and a lower panel 42. Further, like the driver-side module 12, the passenger-side module 14 may omit some of these elements or include other suitable elements to increase the comfort and safety of the passenger of the vehicle.

The center module 16 preferably includes a HVAC unit 44, an audio control 46, and a climate control 48. The HVAC unit 44, which functions to heat and cool the interior of the vehicle, preferably includes conventional elements, such as a fan and piping, but may alternatively include other suitable devices. The audio control 46, which functions to allow control of the audio features of the vehicle, preferably includes a conventional radio 50 with a cassette or CD player or both. The audio control 46 may alternatively include other suitable devices, such as a voice-recognition system. The climate control 48 preferably includes conventional fan and temperature controls, but may alternatively include other suitable devices to allow control of the heating and cooling of the vehicle. Like the driver-side module 12 and the passenger-side module 14, the center module 16 also includes an instrument panel structure 52, and may alternatively omit some of these elements or include other suitable elements to assist in the environmental control of the vehicle by the driver and the passenger.

The left-hand-drive top module 18 (shown in FIG. 1) and the right-hand-drive top module 20 (shown in FIG. 2) function to cover the driver-side module 12, the center module 16, and the passenger-side module 14, and to provide a transition between these elements and the base of a windshield of the vehicle. Both the left-hand-drive top module 18 and the right-hand-drive top module 20, which are typically mirror images of each other, preferably include a display hump 54 that coordinates with the driver display 24 of the driver-side module 12 and a HVAC duct 56 that coordinates with the HVAC unit 44 of the center module 16, but may alternatively include other elements, such as an air bag door that coordinates with the air bag device 38 of the passenger-side module 14. The left-hand-drive top module 18 is fastenable to the first vehicle having a left-hand-drive arrangement (with the driver-side module 12 located on the left side of the vehicle), and the right-hand-drive top module 20 is fastenable to the second vehicle having a right-hand-drive arrangement (with the driver-side module 12 on the right side of the vehicle). Although preferably mirror images, the left-hand-drive top module 18 and the right-hand-drive top module 20 may alternatively have unrelated designs. Like the lower panel 28 of the driver-side module 12, the left-hand-drive top module 18 and the right-hand-drive top module 20 are preferably made from an energy-absorbing material and covered with a cloth or leather material, but may alternatively be made from and covered with other suitable materials.

The cockpit system 10 of the first preferred embodiment may also include a left cover 58 and a right cover 60. The left cover 58 and the right cover 60 mainly provide an aesthetic quality, but may secondarily provide a structural connection between the driver-side module 12 or the passenger-side module 14 and the vehicle. The left cover 58 is fastenable to the left side of the first vehicle and of the second vehicle, while the right cover 60 is fastenable to the right side of the first vehicle and of the second vehicle. Preferably, the left cover 58 is fastenable to both the driverside module 12 and to the passenger-side module 14, such that the left cover 58 may be used in the first vehicle having a left-hand-drive arrangement (shown in FIG. 1) and in the second vehicle having a right-hand-drive arrangement (shown in FIG. 2). Likewise, the right cover 60 is preferably fastenable to both the passenger-side module 14 and to the driver-side module 12. The left cover 58 and the right cover 60, like the lower panel 28 of the driver-side module 12, are preferably made from an energy-absorbing material and covered with a leather or cloth material, but may alternatively be made from or covered with other suitable materials.

Figure 3:
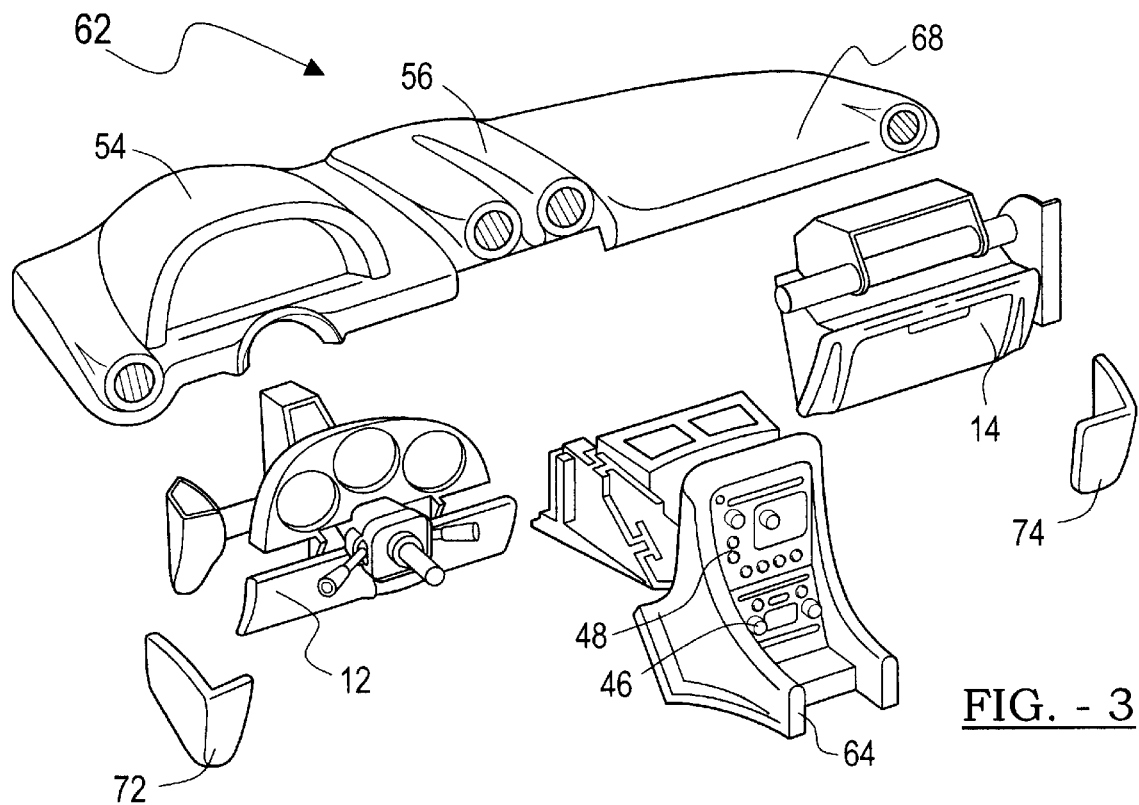
FIG. 3 is an exploded view of a cockpit system of interchangeable modules for a vehicle having a narrow cockpit width, according to a second preferred embodiment of the invention.
Figure 4:
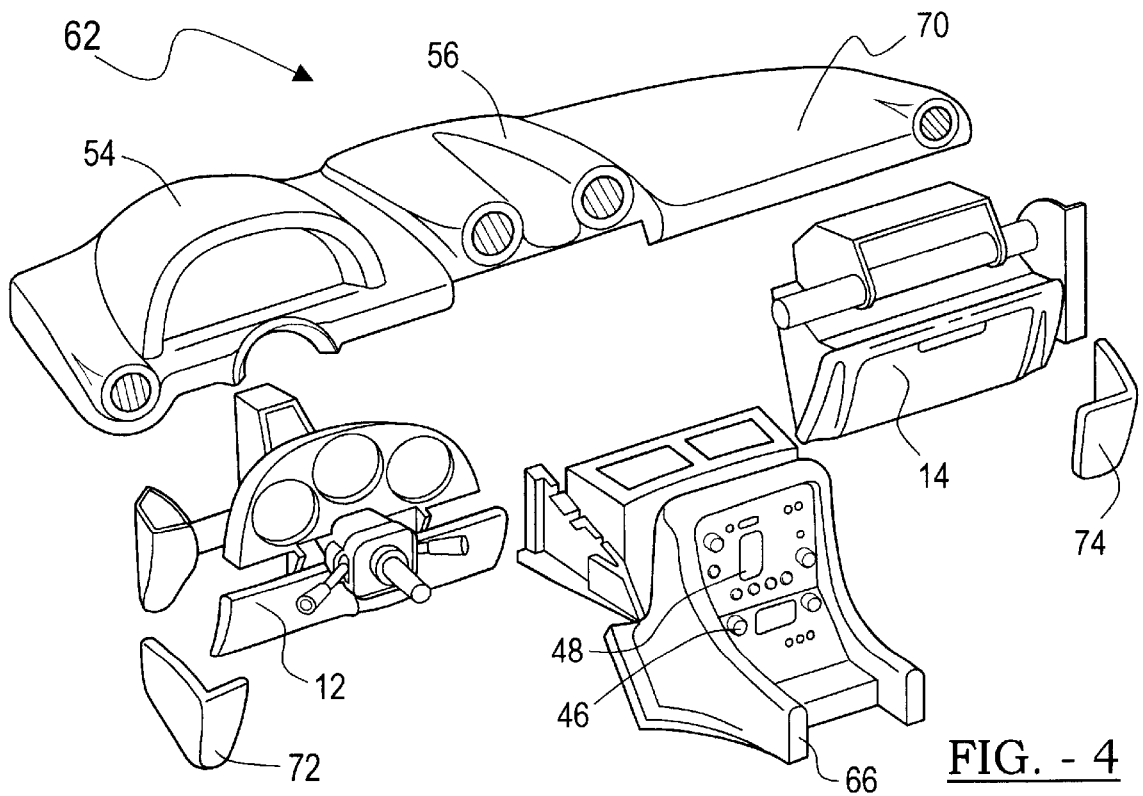
FIG. 4 is an exploded view of a cockpit system of interchangeable modules for a vehicle having a wide cockpit width, according to the second preferred embodiment of the invention.

As shown in FIGS. 3 and 4, the second embodiment of the invention includes a cockpit system 62 of interchangeable modules for a first vehicle having a narrow cockpit width (shown in FIG. 3) and for a second vehicle having a wide cockpit width (shown in FIG. 4). The term "cockpit width" generally means the distance between the A-pillars of a conventional vehicle, but may alternatively mean the distance from one edge of the windshield to the other edge of the windshield in a non-conventional vehicle, such as a roadster made without A-pillars. The terms "narrow" and "wide" describe the relationship between the cockpit width of the first vehicle and the cockpit width of the second vehicle, not the relationship between the cockpit width of the first vehicle or the second vehicle and the cockpit width of other vehicles. In other words, both the first vehicle and the second vehicle may have relatively narrow or relatively wide cockpit widths relative to other vehicles, but these terms only describe the relationship between the cockpit width of the first vehicle and the cockpit width of the second vehicle. The cockpit system 62 of the second preferred embodiment includes a driver-side module 12, a passenger-side module 14, a narrow center module 64 (shown in FIG. 3), a wide center module 66 (shown in FIG. 4), a narrow top module 68 (shown in FIG. 3), and a wide top module 70 (shown in FIG. 4). The driver-side module 12 and the passenger-side module 14 of the second preferred embodiment are preferably identical to the driver-side module 12 and the passenger-side module 14 of the first preferred embodiment (shown in FIGS. 1 and 2). Except as noted below, the narrow center module and the wide center module of the second preferred embodiment are similar to the center module of the first preferred embodiment, and the narrow top module and the wide top module of the second preferred embodiment are similar to the left-hand-drive top module and the right-hand-drive top module of the first preferred embodiment.

The narrow center module 64 and the narrow top module 68 are fastenable to the first vehicle having a narrow cockpit width (shown in FIG. 3), and the wide center module 66 and the wide top module 70 are fastenable to the second vehicle having a wide cockpit width (shown in FIG. 4). As discussed above, the terms "narrow" and "wide" describe the relationship between the narrow center module 64 and the wide center module 66 and between the narrow top module 68 and the wide top module 70, and not the relationship between these elements and the elements of other vehicles. The designs of the narrow center module 64 and the wide center module 66 are preferably related in terms of the location and appearance of the audio control 46 and the climate control 48, but may alternatively be unrelated. Likewise, the designs of the narrow top module 68 and the wide top module 70 may be related in terms of the placement and appearance of the display hump 54 and the HVAC duct 56, but may alternatively be unrelated.

The cockpit system 62 of the second preferred embodiment may also include a left cover 72 and a right cover 74, which are preferably identical to the left cover 58 and the right cover 60 of the first preferred embodiment (shown in FIGS. 1 and 2).

The third preferred embodiment of the invention includes a method of supplying the interchangeable modules of the cockpit system 10 for a first vehicle having a left-hand-drive arrangement and for a second vehicle having a right-hand-drive arrangement. The method includes providing a set of the driver-side modules 12, a set of the passenger-side modules 14, a set of the center modules 16, a set of the left-hand-drive top modules 18, and a set of the right-hand-drive top modules 20. The method further includes supplying one of the driver-side modules 12, one of the center modules 16, one of the passenger-side modules 14, and one of the left-hand-drive top modules 18 for the first vehicle, and supplying one of the driver-side modules 12, one of the center modules 16, one of the passenger-side modules 14, and one of the right-hand-drive top modules 20 for the second vehicle. The term "set" generally means a collection of very similar, if not identical, elements. In other words, the set of driver-side modules 12 could include driver-side modules 12 that are identical, except for slight manufacturing imperfections. The set of driver-side modules 12 could also include driver-side modules 12 that are similar in their physical shape and size, but different in their color or materials. The elements provided and supplied in the method of the third embodiment of the invention are preferably identical to the elements described as the cockpit system 10 of the first preferred embodiment of the invention and as shown in FIGS. 1 and 2. By using the method of the third preferred embodiment, a single set of driver-side modules 12, a single set of passenger-side modules 14, and a single set of center modules 16 may be used in both a first vehicle having a left-hand-drive arrangement and in a second vehicle having a right-hand-drive arrangement.

The fourth preferred embodiment of the invention includes a method of supplying the interchangeable modules of the cockpit system 62 for a first vehicle having a narrow cockpit width and for a second vehicle having a wide cockpit width. The method includes providing a set of the driver-side modules 12, a set of the passenger-side modules 14, a set of the narrow center modules 64, a set of the wide center modules 66, a set of the narrow top modules 68, and a set of the wide top modules 70. The method further includes supplying one of the driver-side modules 12, one of the narrow center modules 64, one of the passenger-side modules 14, and one of the narrow top modules 68 for the first vehicle, and supplying one of the driver-side modules 12, one of the wide center modules 66, one of the passenger-side modules 14, and one of the wide top modules 70 for the second vehicle.

As previously described, the term "set" generally means a collection of very similar, if not identical, elements. The elements provided and supplied in the method of the fourth embodiment of the invention are preferably identical to the elements described as the cockpit system 62 of the second preferred embodiment of the invention and shown in FIGS. 3 and 4. By using the method of the fourth preferred embodiment, a single set of driver-side modules 12 and a single set of passenger-side modules 14 may be used in both a first vehicle having a narrow cockpit width and in a second vehicle having a wide cockpit width.

As any person skilled in the art of cockpit systems will recognize from the previous description and from the figures and claims, modifications and changes can be made to the preferred embodiments of the invention without departing from the scope of the invention.

We claim:

1. A method of supplying interchangeable modules of a cockpit system for a first vehicle having a left-hand-drive arrangement and for a second vehicle having a right-hand drive arrangement, comprising:

providing a set of driver-side modules, each fastenable to a left side of the first vehicle and fastenable to a right side of the second vehicle;

providing a set of passenger-side modules, each fastenable to the right side of the first vehicle and fastenable to the left side of the second vehicle;

providing a set of center modules, each fastenable between one of the driver-side modules and one of the passenger-side modules;

providing a set of left-hand-drive top modules, each fastenable to the first vehicle over one of the driver-side modules, one of the center modules, and one of the passenger side modules;

providing a set of right-hand-drive top modules, each fastenable to the second vehicle over one of the driver-side modules, one of the center modules, and one of the passenger side modules;

supplying one of the driver-side modules, one of the center modules, one of the passenger-side modules, and one of the left-hand-drive top modules for the first vehicle; and supplying one of the driver-side modules, one of the center modules, one of the passenger-side modules, and one of the right-hand-drive top modules for the second vehicle.

2. The method of claim 1 wherein each of the driver-side modules includes a steering control.

3. The method of claim 2 wherein each of the passenger-side modules includes a storage compartment.

4. The method of claim 3 wherein each of the center modules includes an audio control.

5. The method of claim 3 wherein each of the center modules includes a climate control.

6. The method of claim 5 wherein each of the first top modules and the second top modules includes a HVAC duct.

7. The method of claim 1 further comprising:

providing a set of left covers, each fastenable to the left side of the first vehicle and of the second vehicle;

providing a set of right covers, each fastenable to the right side of the first vehicle and of the second vehicle;

supplying one of the left covers and one of the right covers for the first vehicle; and supplying one of the left covers and one of the right covers for the second vehicle.

8. The method of claim 7 wherein each of the left covers are fastenable to one of the driver-side modules and to one of the passenger-side modules, and each of the right covers are fastenable to one of the driver-side modules and to one of the passenger-side modules.

9. A method of supplying interchangeable modules of a cockpit system for a first vehicle having a narrow cockpit width and for a second vehicle having a wide cockpit width, comprising:

providing a set of driver-side modules, each fastenable to the first vehicle and to the second vehicle;

providing a set of passenger-side modules, each fastenable to the first vehicle and to the second vehicle;

providing a set of narrow center modules, each fastenable between one of the driver-side modules and one of the passenger-side modules;

providing a set of wide center modules, each fastenable between one of the driver-side modules and one of the passenger-side modules;

providing a set of narrow top modules, each fastenable to the first vehicle over one of the driver-side modules, one of the center modules, and one of the passenger-side modules;

providing a set of wide top modules, each fastenable to the second vehicle over one of the driver-side modules, one of the center modules, and one of the passenger-side modules;

supplying one of the driver-side modules, one of the narrow center modules, one of the passenger-side modules, and one of the narrow top modules for the first vehicle; and supplying one of the driver-side modules, one of the wide center modules, one of the passenger-side modules, and one of the wide top modules for the second vehicle.

10. The method of claim 9 wherein each of the driver-side modules includes a steering control.

11. The method of claim 10 wherein each of the passenger-side modules includes a storage compartment.

12. The method of claim 11 wherein each of the narrow center modules and wide center modules includes an audio control.

13. The method of claim 11 wherein each of the narrow center modules and wide center modules includes a climate control.

14. The method of claim 13 wherein each of the first top modules and the second top modules includes a HVAC duct.

15. The method of claim 9 further comprising:

providing a set of left covers, each fastenable to a left side of the first vehicle and of the second vehicle;

providing a set of right covers, each fastenable to a right side of the first vehicle and of the second vehicle;

supplying one of the left covers and one of the right covers for the first vehicle; and supplying one of the left covers and one of the right covers for the second vehicle.

16. A cockpit system of interchangeable modules for a first vehicle having a left-hand-drive arrangement and for a second vehicle having a right-hand-drive arrangement, comprising:

a driver-side module;

a passenger-side module;

a center module fastenable between said driver-side module and said passenger-side module;

a left-hand-drive top module;

a right-hand-drive top module;

wherein said driver-side module is fastenable to a left side of the first vehicle, said passenger-side module is fastenable to a right side of the first vehicle, and said left-hand-drive top module is fastenable to the first vehicle over said driver-side module, said center module, and said passenger-side module; and wherein said driver-side module is fastenable to the right side of the second vehicle, said passenger-side module is fastenable to the left side of the second vehicle, and said right-hand-drive top module is fastenable to the second vehicle over said driver-side module, said center module, and said passenger-side module.

17. The cockpit system of claim 16 wherein said driver-side module includes a steering control.

18. The cockpit system of claim 17 wherein said passenger-side module includes a storage compartment.

19. The cockpit system of claim 18 wherein said center module includes an audio control.

20. The cockpit system of claim 18 wherein said center module includes a climate control.

21. The cockpit system of claim 20 wherein said first top module and said second top module includes a HVAC duct.

22. The cockpit system of claim 16 further comprising:
   a left cover fastenable to the left side of the first vehicle and of the second vehicle; and
   a right cover fastenable to the right side of the first vehicle and of the second vehicle.

23. A cockpit system of interchangeable modules for a first vehicle having a narrow cockpit width and for a second vehicle having a wide cockpit width, comprising:
   a driver-side module;
   a passenger-side module;
   a narrow center module;
   a wide center module,
   a narrow top module;
   a wide top module;
   wherein said driver-side module is fastenable to the first vehicle, said passenger-side module is fastenable to the first vehicle, said narrow center module is fastenable between said driver-side module and said passenger-side module, and said narrow top module is fastenable to the first vehicle over said driver-side module, said narrow center module, and said passenger-side module; and
   wherein said driver-side module is fastenable to the second vehicle, said passenger-side module is fastenable to the second vehicle, said wide center module is fastenable between said driver-side module and said passenger-side module, and said wide top module is fastenable to the second vehicle over said driver-side module, said wide center module, and said passenger-side module.

24. The cockpit system of claim 23 wherein said driver-side module includes a steering control.

25. The cockpit system of claim 24 wherein said passenger-side module includes a storage compartment.

26. The cockpit system of claim 25 wherein said narrow center module and said wide center module includes an audio control.

27. The cockpit system of claim 25 wherein said narrow center module and said wide center module includes a climate control.

28. The cockpit system of claim 27 wherein said narrow top module and said wide top module includes a HVAC duct.

29. The cockpit system of claim 23 further comprising:
   a left cover fastenable to a left side of the first vehicle and of the second vehicle; and
   a right cover fastenable to a right side of the first vehicle and of the second vehicle.

* * * * *